United States Patent
Nakamura et al.

(10) Patent No.: US 11,567,475 B2
(45) Date of Patent: Jan. 31, 2023

(54) SERVO CONTROLLER

(71) Applicant: FANUC CORPORATION, Yamanashi (JP)

(72) Inventors: Tsutomu Nakamura, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 315 days.

(21) Appl. No.: 16/925,084

(22) Filed: Jul. 9, 2020

(65) Prior Publication Data

US 2021/0018898 A1   Jan. 21, 2021

(30) Foreign Application Priority Data

Jul. 19, 2019  (JP) .............................. JP2019-133482

(51) Int. Cl.
*G05B 19/414*   (2006.01)

(52) U.S. Cl.
CPC ............... *G05B 19/4141* (2013.01); *G05B 2219/41002* (2013.01)

(58) Field of Classification Search
CPC ...... G05B 19/4141; G05B 2219/41002; H02P 3/18; H02P 5/74; H02P 23/20
USPC ........................................ 318/569, 567, 560
See application file for complete search history.

(56) References Cited

U.S. PATENT DOCUMENTS

| | | | |
|---|---|---|---|
| 5,872,439 A * | 2/1999 | Nomura | H02P 23/16 |
| 10,437,227 B2 * | 10/2019 | Shinoda | H02P 29/028 |
| 10,924,041 B2 * | 2/2021 | Shinoda | H02P 7/292 |

FOREIGN PATENT DOCUMENTS

JP          2012-114994 A      6/2012

* cited by examiner

*Primary Examiner* — David Luo
(74) *Attorney, Agent, or Firm* — Studebaker & Brackett PC

(57) ABSTRACT

To provide a servo controller for an industrial machine allowing construction of a system achieving more excellent power efficiency than a conventional system. A servo controller includes: a driving motor that drives an industrial machine; a load detecting unit that detects a load on the driving motor or the amount of power consumed by the driving motor; a buffer motor that feeds regenerative power to the driving motor on the basis of a result of the detection by the load detecting unit; and a base speed setting unit for recovering the buffer motor to a second base speed set to be lower than a constant first base speed preset for the buffer motor and applied before the regenerative power is fed to the driving motor after the buffer motor is decelerated from the first base speed and the regenerative power is fed to the driving motor.

8 Claims, 5 Drawing Sheets

SERVO CONTROLLER

This application is based on and claims the benefit of priority from Japanese Patent Application No. 2019-133482, filed on 19 Jul. 2019, the content of which is incorporated herein by reference.

BACKGROUND OF THE INVENTION

Field of the Invention

The present invention relates to a servo controller.

Related Art

As has been well known in the field of machining, repetition of the same motion or making of a complicated motion is highly automated by employing a computerized numerical control (CNC) technique and numerically controlling a stroke or a move speed using a computer. Further, driving of a servo motor (motor) for driving an axis of an industrial machine such as a press machine, an injection molding machine, a machine tool, or a robot is controlled in terms of an amount of rotation, speed, torque, etc.

When a load such as a torque on a servo motor increases suddenly during pressing by a press machine, clamping by an injection molding machine, or a cutting by a machine tool, for example, power consumption by the servo motor suddenly jumps. As peak power increases, a contracted electricity rate is required to be set higher.

Under control conventionally executed responsive to this issue shown in FIG. 4, for example, power is fed from a common power supply to a plurality of servo amplifiers for controlling respective driving servo motors, and power is fed (regenerated) from a buffer servo motor to coincide with timing of sudden jump of power consumption by the driving servo motor, thereby reducing peak power (removing a peak).

In this case, as shown in FIG. 5, inertia is applied to the buffer servo motor to rotate the buffer servo motor at the same base speed (base speed 1) set in advance, thereby storing power. When there arises a need for power regeneration, a speed of driving the buffer servo motor is reduced to feed power to the driving servo motor. Further, by making communication between the plurality of driving servo amplifiers, a servo amplifier to receive regenerative power is determined. In this way, reduction in power consumption by the driving servo motor is encouraged efficiently and effectively. After the peak power is reduced, driving of the buffer servo motor is accelerated to store power. Further, the buffer servo motor is driven again at the base speed (base speed 1).

As an example, patent document 1 discloses the following. "A power storage device includes a fly wheel, a generator motor coupled to the fly wheel, and an inverter having an AC side connected to the generator motor and a DC side connected to a DC link unit. An alternating current of a variable frequency is fed from the inverter to the generator motor to control the rotation number of the fly wheel, thereby giving and receiving electric energy to and from the DC link unit. The inverter includes: a voltage detector that detects a voltage at the DC link unit; a voltage command value setting unit that sets either a first voltage command value or a second voltage command value as a voltage command value for the DC link unit on the basis of a detected voltage given from the voltage detector and the rotation number of the fly wheel; and a maximum rotation number setting unit that sets either a first maximum rotation number or a second maximum rotation number as a maximum of the rotation number of the fly wheel on the basis of the detected voltage given from the voltage detector and the rotation number of the fly wheel."

Patent Document 1: Japanese Unexamined Patent Application, Publication No. 2012-114994

SUMMARY OF THE INVENTION

As described above, under the conventional control, after the buffer servo motor finishes power storage/feeding motion, the buffer servo motor is recovered to a constant base speed (base speed 1) independently of the motion of the driving servo motor, thereby ensuring a predetermined energy value.

As shown in FIG. 5, however, controlling the buffer servo motor in this way causes the following inconvenience. As the inertia of the buffer servo motor increases, the buffer servo motor is accelerated suddenly after regeneration control to increase a need for control of power storage by the buffer servo motor. This power storage control results in an excessive speed of the buffer servo motor to cause energy loss, and this results in efficiency reduction.

One aspect of a servo controller of this disclosure is a servo controller for controlling a motor for driving an axis of an industrial machine. The servo controller includes: a driving motor that drives the axis; a load detecting unit that detects a load on the driving motor or the amount of power consumed by the driving motor; a buffer motor that feeds regenerative power to the driving motor on the basis of a result of the detection by the load detecting unit; and a base speed setting unit for recovering the buffer motor to a second base speed set to be lower than a constant first base speed preset for the buffer motor and applied before the regenerative power is fed to the driving motor after the buffer motor is decelerated from the first base speed and the regenerative power is fed to the driving motor.

According to the one aspect of the servo controller of this disclosure, excessive increase in the speed of the buffer motor during regeneration of the driving motor can be prevented and a maximum speed of the buffer motor can be controlled at a low speed. This makes it possible to reduce power consumption resulting from friction of a fly wheel, for example.

As a maximum speed of the buffer motor can be controlled at a low speed, an upper limit of the base speed (first base speed) can be set higher than in the conventional case. Namely, the first base speed can be increased to a substantially rated speed of the buffer motor, thereby encouraging increase in power to be fed on the basis of inertia.

Additionally, reduction can be achieved in a total sum of power to be fed from the buffer motor to the driving motor and power stored in the buffer motor to be fed as regenerative power to the driving motor (a sum of power to be fed from the buffer motor and power stored in the buffer motor). As a result, it becomes possible to encourage reduction in energy loss.

Thus, the servo controller for an industrial machine of this disclosure makes it possible to construct a system achieving more excellent power efficiency than a conventional system.

DETAILED DESCRIPTION OF THE INVENTION

A servo controller according to one embodiment will be described below by referring to FIGS. 1 to 3.

The servo controller according to the embodiment is a servo controller that allows reduction in power consumption during application of a high load such as a high torque on a driving servo motor (motor) for driving an axis of an industrial machine.

The industrial machine is an industrial machine to be subjected to sudden load increase when the industrial machine is driven. A representative example of the industrial machine includes a press machine, a press-fitting machine, a die-casting machine, an injection molding machine, a cutting machine, a machine tool, and a robot. The industrial machine may certainly be other types of industrial machines including a transport machine, a measuring instrument, a testing device, a printing machine, food machinery, a wrapping machine, a welding machine, a washing machine, a painting machine, an assembling machine, a mounting machine, woodworking machinery, a sealing device, etc. In the case of a press machine, for example, a driving servo motor is subjected to application of a sudden load during press working to cause sudden increase in power consumption.

Figure 1:
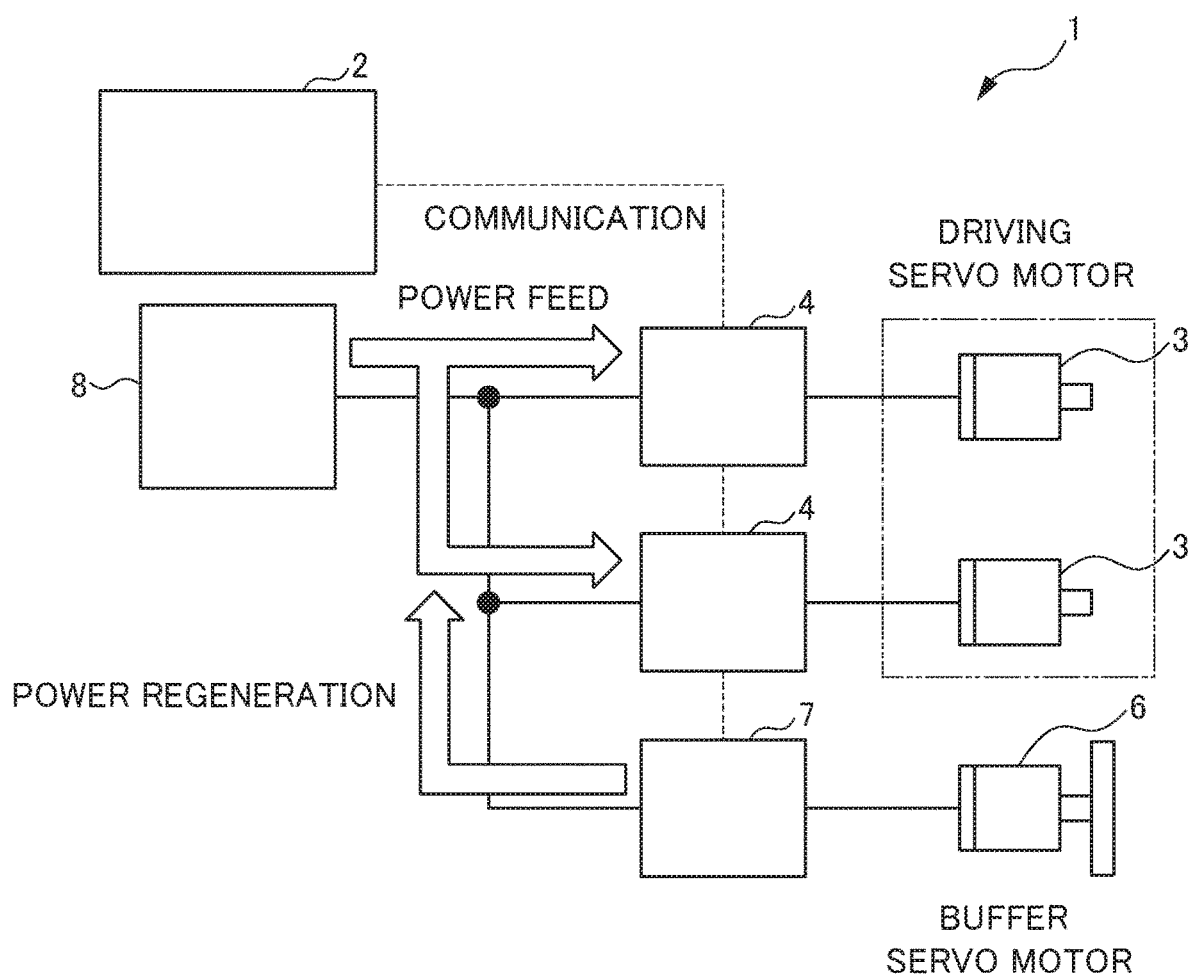
FIG. 1 is a view showing a servo controller according to one aspect.
Figure 2:
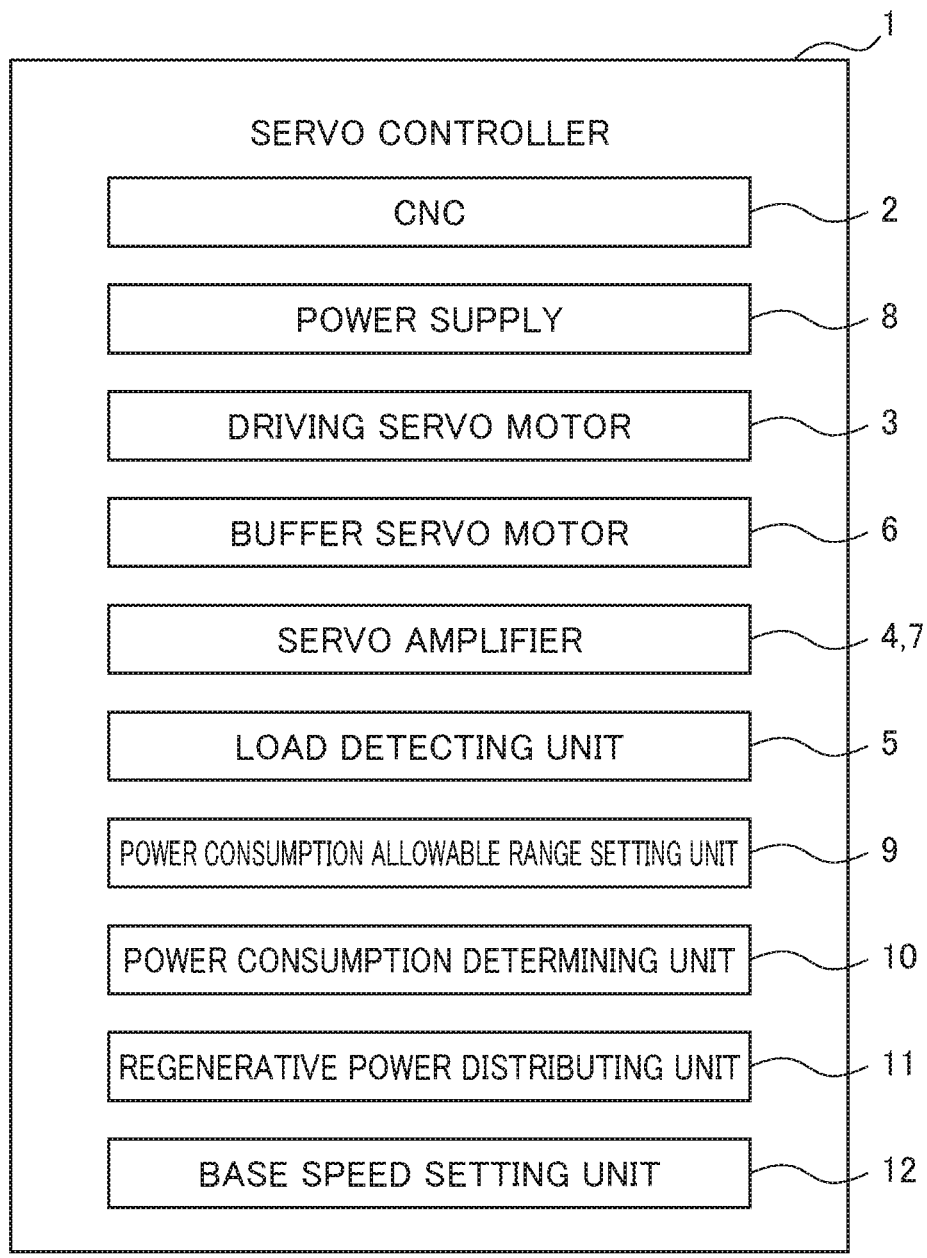
FIG. 2 is a block diagram showing the servo controller according to the one aspect.

As shown in FIGS. 1 and 2, a servo controller 1 for an industrial machine according to the embodiment includes: a CNC (NC) 2 as a commanding unit; a plurality of driving servo motors (motors) 3; a plurality of driving servo amplifiers 4 that controls driving of each of the driving servo motors 3 on the basis of a command from the CNC 2; a load detecting unit 5 that detects a load on each driving servo motor 3 or the amount of power consumed by each driving servo motor 3 (power consumption and regenerative power); a buffer servo motor (motor) 6 for feeding regenerative power to the driving servo motor 3 on the basis of a result of the detection by the load detecting unit 5; a buffer servo amplifier 7 that controls driving of the buffer servo motor 6; and a common power supply (power supply) 8 that feeds power to the plurality of driving servo motors 3 and the buffer servo motor 6.

Figure 3:
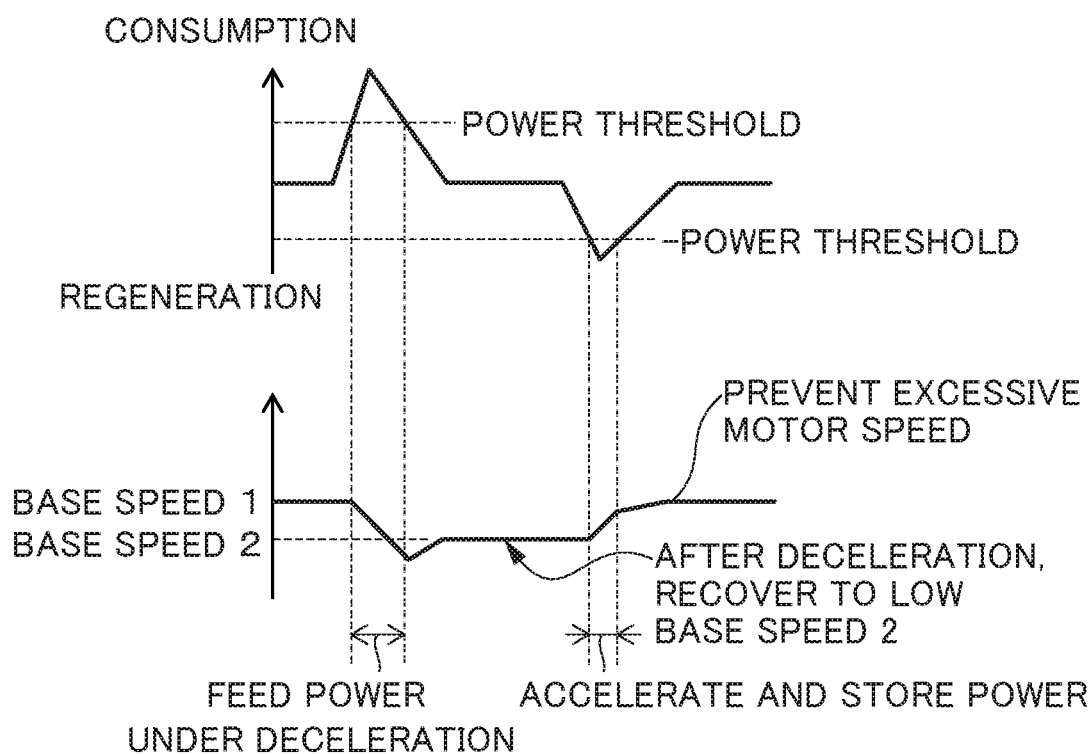
FIG. 3 is a view showing a method of controlling driving of a buffer servo motor implemented by the servo controller according to the one aspect.
Figure 4:
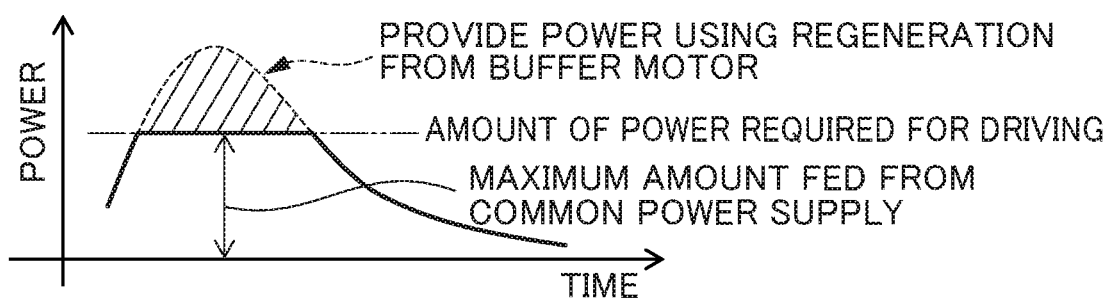
FIG. 4 is a view used for explaining reduction in power consumption by a driving servo motor through regeneration from a buffer servo motor.
Figure 5:
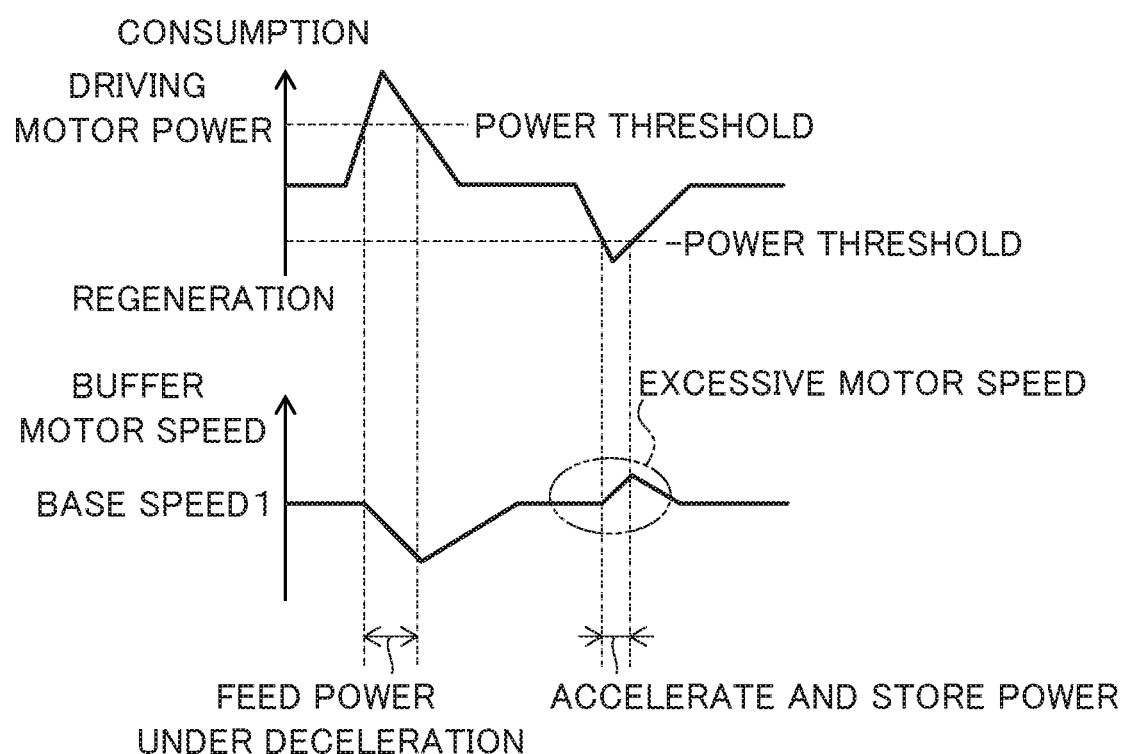
FIG. 5 is a view showing a conventional method of controlling driving of a buffer servo motor.

The configuration of the servo controller 1 for an industrial machine according to the embodiment further includes: a power consumption allowable range setting unit 9 that sets an allowable range (consumption-side threshold and regenerative-side threshold) for power consumption by the driving servo motor 3; a power consumption determining unit 10 that determines whether the power consumption by the driving servo motor 3 falls within the allowable range; a regenerative power distributing unit 11 for distributing regenerating power generated by the buffer servo motor 6; and a base speed setting unit 12 for recovering the buffer servo motor 6 to a second base speed (base speed 2 in FIG. 3) set to be lower than a constant first base speed (base speed 1 in FIG. 3 (FIG. 5)) preset for the buffer servo motor 6 and applied before the regenerative power is fed to the driving servo motor 3 after the buffer servo motor 6 is decelerated from the first base speed and the regenerative power is fed to the driving servo motor 3, as shown in FIG. 3 (FIGS. 1 and 2).

The driving servo motor 3 and the buffer servo motor 6 are rotary motors, for example. The driving servo motor 3 may be a different motor such as a linear motor.

Preferably, the base speed setting unit 12 sets the second base speed to be recovered in response to power storage or feeding operation performed last time for the driving servo motor 3. Preferably, the first base speed is set at a speed (substantially rated speed) slightly lower than a rated speed of the driving servo motor 3.

In the servo controller 1 for an industrial machine according to the embodiment having the foregoing configuration, a command from the CNC 2 is transmitted to the driving servo amplifier 4 and the buffer servo amplifier 7. Then, the servo amplifiers 4 and 7 control driving of corresponding ones of the driving servo motor 3 and the buffer servo motor 6. The driving servo amplifier 4, the buffer servo amplifier 7, the driving servo motor 3, and the buffer servo motor 6 are driven in response to feed of power from the common power supply 8.

Inertia is applied to the buffer servo motor 6. If a load acting on the driving servo motor 3 falls within the allowable range set by the power consumption allowable range setting unit 9, the power consumption determining unit 10 determines this falling within the allowable range and drives the buffer servo motor 6 to rotate at the constant first base speed (base speed 1) set by the base speed setting unit 12, thereby storing power.

As shown in FIG. 3, when a load acting on the driving servo motor 3 increases during a pressing step performed in a press machine, for example, and a detection result obtained by the load detecting unit 5 reaches the consumption-side threshold for power consumption by the driving servo motor 3 set by the power consumption allowable range setting unit 9, the power consumption determining unit 10 determines this reach. Then, the buffer servo amplifier 7 to which the plurality of driving servo amplifiers 4 is communicably connected receives this result, executes control of decelerating the buffer servo motor 6, and feeds the stored power to the driving servo motor 3.

In this case, the power consumption determining unit 10 determines which of the plurality of driving servo motors 3 is to receive feed of regenerative power, and determines the amount of regenerative power to be fed to each of these driving servo motors 3. On the basis of these determination results, the regenerative power distributing unit 11 distributes power and feeds the distributed power to each driving servo motor 3. As a result, power stored in the buffer servo motor 6 is fed to the driving servo motor 3 where power consumption has reached the consumption-side threshold as a result of the load increase. This makes power consumption fall below the consumption-side threshold, namely, makes the power consumption fall within the allowable range, thereby achieving reduction in peak power (removal of a peak).

When the load on the driving servo motor 3 reduces as the pressing step in the press machine proceeds and power consumption falls below the consumption-side threshold (power consumption is stabilized within the allowable range), the buffer servo motor 6 is accelerated to restart power storage. In the servo controller 1 for an industrial machine according to the embodiment, at the time of restart of this power storage, the base speed setting unit 12 is used for recovering the buffer servo motor 6 to the second base speed (base speed 2) set to be lower than the first base speed (base speed 1) preset for the buffer servo motor 6 and applied before the regenerative power is fed to the driving servo motor 3 (applied last time, for example). The buffer servo motor 6 is driven at the low set second base speed and then power is stored.

When the load on the driving servo motor 3 is reduced further and power consumption is reduced to reach the regenerative-side threshold, the power consumption determining unit 10 determines this reach. Then, the buffer servo amplifier 7 to which the plurality of driving servo amplifiers 4 is communicably connected receives this result, and executes control of accelerating the buffer servo motor 6. When power consumption exceeds the regenerative-side threshold (power consumption is stabilized within the allowable range), the buffer servo motor 6 is accelerated gradually. As a result of such stepwise acceleration, the speed of the buffer servo motor 6 is recovered to the first base speed. This prevents the speed of the buffer servo motor 6 from increasing suddenly during recovery to the first base speed, unlike in the conventional case.

Thus, the servo controller 1 for an industrial machine according to the embodiment can prevent excessive increase in the speed of the buffer servo motor 6 during regeneration of the driving servo motor 3 and can control a maximum speed of the buffer servo motor 6 at a low speed. This makes it possible to reduce power consumption resulting from friction of a fly wheel, for example.

As the servo controller 1 for an industrial machine according to the embodiment can control a maximum speed of the buffer servo motor 6 at a low speed, an upper limit of the base speed (first base speed) can be set higher than in the conventional case. Namely, the first base speed can be increased to the substantially rated speed of the buffer servo motor 6, thereby encouraging increase in power to be fed on the basis of inertia.

Additionally, the servo controller 1 for an industrial machine according to the embodiment makes it possible to reduce a total sum of power to be fed from the buffer servo motor 6 to the driving servo motor 3 and power stored in the buffer servo motor 6 to be fed as regenerative power to the driving servo motor 3 (a sum of power to be fed from the buffer servo motor 6 and power stored in the buffer servo motor 6). As a result, it becomes possible to encourage reduction in energy loss.

Thus, the servo controller 1 for an industrial machine according to the embodiment makes it possible to construct a system achieving more excellent power efficiency than a conventional system.

While the embodiment of the servo controller for an industrial machine has been described above, the present invention is not limited to the foregoing embodiment but it can be changed appropriately within a range not deviating from the substance of the invention.

EXPLANATION OF REFERENCE NUMERALS

1 Servo controller for industrial machine
2 CNC (NC)
3 Driving servo motor (motor)
4 Driving servo amplifier
5 Load detecting unit
6 Buffer servo motor (motor)
7 Buffer servo amplifier
8 Common power supply (power supply)
9 Power consumption allowable range setting unit
10 Power consumption determining unit
11 Regenerative power distributing unit
12 Base speed setting unit

What is claimed is:

1. A servo controller comprising:
   a driving motor that drives an industrial machine;
   a load detecting unit that detects a load on the driving motor or the amount of power consumed by the driving motor;
   a buffer motor that feeds regenerative power to the driving motor on the basis of a result of the detection by the load detecting unit; and
   a base speed setting unit to operate the buffer motor after feeding the regenerative power at a second base speed set to be lower than a constant first base speed preset for the buffer motor and increasing rotational speed to the first base speed from the second base speed before the regenerative power is fed to the driving motor.

2. The servo controller according to claim 1, wherein the base speed setting unit sets the second base speed in response to power storage or feeding operation performed last time for the driving motor.

3. The servo controller according to claim 2, wherein the first base speed is set at a substantially rated speed of the driving motor.

4. The servo controller according to claim 3, wherein the industrial machine is a press machine.

5. The servo controller according to claim 2, wherein the industrial machine is a press machine.

6. The servo controller according to claim 1, wherein the first base speed is set at a substantially rated speed of the driving motor.

7. The servo controller according to claim 6, wherein the industrial machine is a press machine.

8. The servo controller according to claim 1, wherein the industrial machine is a press machine.

* * * * *